United States Patent
Liu et al.

(10) Patent No.: US 8,654,618 B1
(45) Date of Patent: Feb. 18, 2014

(54) TAMR STRUCTURE WITH HDI SENSOR FOR HEAD-DISK INTERFERENCE AND TEMPERATURE RISE SENSING

(75) Inventors: Kowang Liu, Fremont, CA (US); Xuhui Jin, San Jose, CA (US); Xiaohua Lou, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/617,487

(22) Filed: Sep. 14, 2012

(51) Int. Cl.
*G11B 11/00* (2006.01)

(52) U.S. Cl.
USPC .......................................... 369/13.33

(58) Field of Classification Search
USPC ............. 369/13.02, 13.13, 13.33; 360/31, 75; 29/603.07–603.27
See application file for complete search history.

(56) References Cited

U.S. PATENT DOCUMENTS

| | | | |
|---|---|---|---|
| 7,742,255 B2 | 6/2010 | Daugela et al. | |
| 7,933,085 B2 | 4/2011 | Baumgart et al. | |
| 8,023,226 B2 | 9/2011 | Shimazawa et al. | |
| 8,036,069 B1 * | 10/2011 | Jin et al. | 369/13.32 |
| 2011/0228651 A1 | 9/2011 | Gage et al. | |
| 2011/0235207 A1 * | 9/2011 | Yang | 360/75 |
| 2011/0299367 A1 | 12/2011 | Naniwa et al. | |
| 2012/0002319 A1 * | 1/2012 | Kondo | 360/59 |
| 2013/0094104 A1 * | 4/2013 | Ngan et al. | 360/31 |
| 2013/0148485 A1 * | 6/2013 | Jin et al. | 369/13.17 |

* cited by examiner

*Primary Examiner* — Brenda Bernardi
(74) *Attorney, Agent, or Firm* — Saile Ackerman LLC; Stephen B. Ackerman

(57) ABSTRACT

A DFH (dynamic fly height) equipped TAMR (Thermal Assisted Magnetic Recording) write head uses optical-laser excited surface plasmons to locally heat a magnetic recording medium so that writing is enabled, while a DFH heater allows the head to fly very close to the magnetic medium. The write head includes an integral HDI sensor with a narrow track width for high spatial resolution. The HDI sensor is calibrated to obtain a relationship between its resistance and heater power. When the TAMR head is operated, measurement of high frequency voltage across the HDI sensor as a function of heater power indicates impending touchdowns, while use of the calibrated resistance curve enables the sensor to monitor temperature variations within components of the TAMR write head.

20 Claims, 3 Drawing Sheets

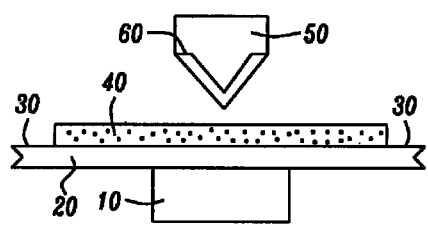
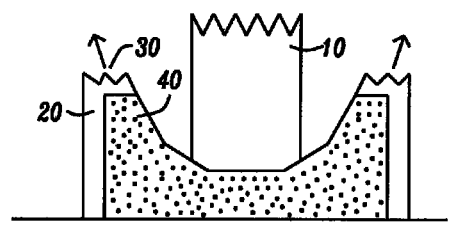
FIG. 1  FIG. 2
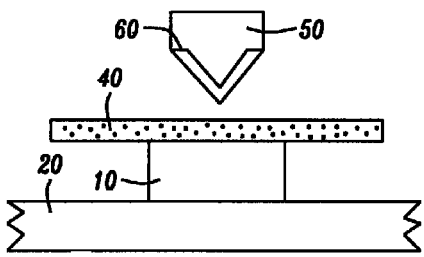
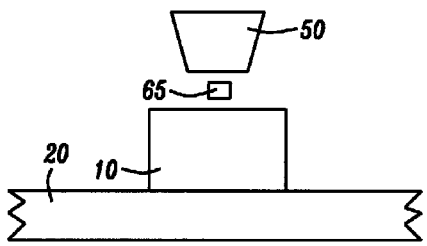
FIG. 3  FIG. 4
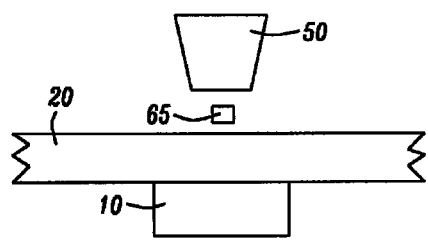
FIG. 5

TAMR STRUCTURE WITH HDI SENSOR FOR HEAD-DISK INTERFERENCE AND TEMPERATURE RISE SENSING

BACKGROUND

1. Technical Field

This disclosure relates to the fabrication of magnetic read/write heads that employ TAMR (thermally assisted magnetic recording) to enable writing on magnetic media having high coercivity and high magnetic anisotropy. More particularly, it relates to such a TAMR structure that incorporates an integral sensor for detecting interference events and temperature increases.

2. Description

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions of magnetic material on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

Prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted recording schemes either involve deep sub-micron localized heating by an optical beam or ultra-high frequency AC magnetic field generation.

The heating effect of TAMR works by raising the temperature of a small region of the magnetic medium to essentially its Curie temperature ($T_C$), at which temperature both its coercivity and anisotropy are significantly reduced, if not completely eliminated, and magnetic writing becomes easier to produce within that region. The magnetic field of the write head then creates the desired magnetic transitions in the heated medium and the medium is then cooled so that the written signal is stored.

Very quick heating and cooling is required in such a process so that the heat-affected zone is limited in extent and adjacent regions do not suffer unwanted erasures. In a particular implementation of TAMR, heating is produced by the transfer of electromagnetic energy from a laser diode (LD), typically operating in the optical range, through a waveguide (WG) and finally to a small, sub-micron sized region of a rotating magnetic medium through interaction of the magnetic medium with the near field of an edge plasmon produced by a plasmon generator (PG) excited by the laser/waveguide combination. The transferred electromagnetic energy then causes the temperature of the medium to increase locally. The solid state laser diode is typically mounted on top of the slider using a specially designed suspension.

Thermal flows inside the recording head becomes an important consideration during the TAMR operation. In addition to the dynamic flying height (DFH) operation of the write head and write-current driven protrusion, the heat generated by the laser diode and the near-field plasmon generator all generate sharp local heating that must be managed.

Sharp down-track and cross-track protrusion profiles of the transducer ABS, produced by the DFH mechanism, create touchdown (TD) detection issues even for state-of-the-art detection methods such as acoustic emission (AE) sensors, and so on. Delayed or even failed TD detection gives the protruded main pole and the LD/PG portion of the write head structure very high contact mechanical stress that may easily cause early reliability problems. The heat generated by the LD/PG combination compounds the head-disk interference (HDI) issue because the elevated temperatures accelerates the failure of the magnetic main pole and the optical components of the LD/PG. Thus, TAMR development becomes problematic as a result of the complex interactions between magnetic/optical/thermal/mechanical aspects of the system. There is thus a clear need to enable TD detection near the recording locale and to enable dependable monitoring of temperature increases in this locale.

Various aspects of this problem have been addressed, but none have applied the methodology of the present disclosure nor have they achieved its results. We mention, for example, Shimazawa et al. (U.S. Pat. No. 8,023,226), Naniwa et al. (US Publ. Appl. 2011/0299367), Baumgart et al. (U.S. Pat. No. 7,933,085), Gage et al. (US Publ. Appl. 2011/0228651) and Daugela et al. (U.S. Pat. No. 7,742,255), none of which have used the methods of the present disclosure.

SUMMARY

It is an object of this disclosure to produce a TAMR structure that has the ability to sense impending HDI events that are induced by touchdowns.

It is a further object of this disclosure to produce a TAMR structure that has the ability to monitor temperature changes within the TAMR during its operation.

It is still a further object of this disclosure to produce a TAMR structure that has the ability to sense TD-induced ABS vibration, which is a modulated heating and cooling cycle.

It is yet a further object of this disclosure to provide a TAMR that incorporates a reliable, integrated method for touchdown detection, local protrusion monitoring, temperature sensing and thermal-mechanical reliability monitoring and control.

These objects will be realized by means of an HDI sensor that is integrated within the write-head portion of the TAMR and that combines excellent temperature sensitivity and spatial resolution. Moreover, the sensor serves a dual purpose of indicating an impending (and occurring) touchdown event and monitoring temperature changes within the optical components of the TAMR system.

The basic structure of the sensor is that of a material film having high temperature coefficient of resistivity (TCR), such as nickel and nickel iron alloys that can convert temperature variations into resistance variations. However, unlike present HDI sensors that are positioned between the read head and write head portions of the TAMR device, this sensor will be integrated within the optical radiation delivery and confinement elements of the TAMR, such as the optical waveguide (WG) and plasmon shield (PS). The width of the HDI sensor strip is less than a few microns and generally about 1 micron, its thickness is approximately 200 Angstroms and its height (vertically) is approximately 0.1 micron. These dimensions are able to provide the required spatial resolution. The sensor can be formed with a lead overlay structure of low resistivity metals such as Au, Cu or Ru and can cover both sides of the strip to define the track width and form the lead interconnect to the via.

BRIEF DESCRIPTION OF THE DRAWINGS

The objects, features, and advantages of the various aspects of the present disclosure are understood within the context of the Detailed Description as set forth below. This Description is to be understood within the context of the accompanying figures, wherein:

FIG. 1 is a schematic illustration of an ABS view of an integrated HDI sensor in a TAMR head having a flat plasmon shield (PS).

FIG. 2 is a schematic illustration of a top-down view of the integrated HDI sensor of FIG. 1.

FIG. 3 is a schematic illustration of an ABS view of an integrated HDI sensor in a TAMR head having a flat plasmon shield (PS), where the sensor is positioned differently than in FIG. 1.

FIG. 4 is a schematic illustration of an ABS view of an integrated HDI sensor in a TAMR head with a PEG and having a flat plasmon shield (PS).

FIG. 5 is a schematic illustration of an ABS view of an integrated HDI sensor in a TAMR head with a PEG and having a flat plasmon shield (PS) but arranged differently than in FIG. 4.

DETAILED DESCRIPTION

Figure 6:
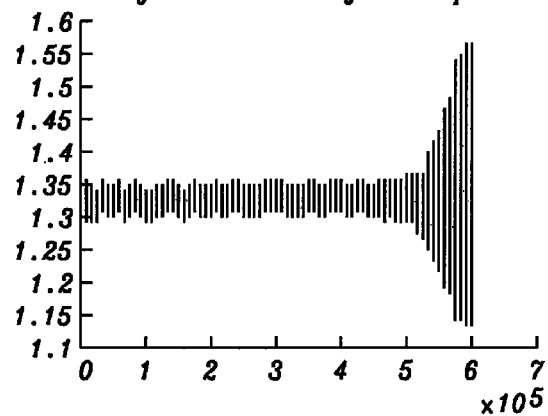
FIG. 6 is a graphical representation of the relationship between HDI AC voltage and increasing heater power (in units of $10^5$ mW) showing a strong modulation approaching touchdown.

The present disclosure, in each of its various aspects, provides an HDI sensor integrated within a TAMR head for the purpose of detecting impending touchdowns with a magnetic medium and, in addition, for monitoring temperature variations of components within the TAMR head itself. Referring first to FIG. 1, there is shown a schematic air bearing surface (ABS) view of a portion of the TAMR head (looking up at the head from the medium surface).

The portions of the TAMR head and integrated HDI sensor that are shown are as follows. There is shown the ABS end of a waveguide (10). Covering the waveguide and extending laterally to either side of the waveguide to a total width of approximately 1 microns is the HDI strip (20) consisting of a strip of material, such as nickel or iron-nickel alloy, having a high temperature coefficient of resistivity (TCR), so that the resistivity of the strip changes rapidly and greatly as a function of temperature. The HDI strip is generally formed to a thickness of approximately 200 Angstroms and has a height (vertically) of approximately 0.1 microns. The extreme lateral edges of the strip (30) can be contacted by electrical leads of low resistivity that both define the effective width of the strip and serve as electrical contacts to circuitry in the disk drive.

A plasmon shield (40) is positioned in front of (on the trailing edge side) the sensor strip. Such a shield may not be required if the thermal spot size is sufficiently small, but in general the shield assists in restricting the spot size. The pole tip (50) of the main magnetic pole of the write head is partially covered by a plasmon generator (60), which is a strip of highly conductive metal such as Au. The optical mode in the waveguide couples with the plasmon generator in a region of partial overlap above the ABS to create surface plasmons that propagate down the generator to the ABS, where their near-fields transfer thermal energy to the magnetic medium just below the magnetic pole tip enabling the write process to occur. Note that in this mounting position, the HDI sensor is particularly able to monitor temperature changes in the plasmon shield (40).

Referring next to FIG. 2, there is shown schematically a front, partially cut-away view of the structure shown in FIG. 1, looking from the pole towards the cut-away plasmon shield (40). The HDI sensor strip (20) is partially exposed behind the shield (40) and the lateral edges of the HDI strip are covered by the conducting leads (30). The waveguide (10) is seen behind the HDI sensor strip.

Referring now to FIG. 3, there is shown a second configuration of a shielded TAMR head with an integrated HDI sensor. In this configuration, shown schematically from the ABS looking upward, there is shown the HDI sensor strip (20) behind the waveguide (10) and the plasmon shield (40) is shown in front of the waveguide. The tapered (on its leading edge side) pole tip (50) and the partially covering plasmon generator (60) are shown essentially as in FIG. 1. This position of the HDI sensor as compared to its positioning in FIG. 1 is determined by processing preferences. Another consideration is the potential loss of optical energy in the coupling between the waveguide and the plasmon generator.

Referring now to schematic FIG. 4, there is shown a third configuration of a TAMR head with an integrated HDI sensor. In this configuration, the ABS end of the plasmon generator terminates in a PEG element (65), which is an integral or separated small portion of the plasmon generator designed to restrict the near field of the plasmon to a small region beneath and immediately surrounding the PEG. The HDI sensor strip (20) is shown here behind (to the leading edge side) the waveguide (WG) (10). The PEG is positioned between the WG and the magnetic pole tip (50), which in this configuration has a flat leading edge. Note that the PEG configuration is very effective at restricting the thermal spot size so an additional plasmon shield is not required.

Referring now to schematic FIG. 5, there is shown an alternative configuration to that illustrated in FIG. 4. In this configuration, the PEG (65) and pole tip (50) are positioned as in FIG. 4, but the HDI sensor strip (20) is located on the trailing edge side of the waveguide (10).

The operation of the integrated HDI sensor for both touchdown detection and temperature monitoring can be understood by means of the following figures. First, we will discuss its use for touchdown detection. Referring to schematic FIG. 6, there is shown a graphical representation of the raw data corresponding to high frequency voltage variation response of the HDI sensor to the effects of a touchdown contact with the magnetic medium (eg. a rotating disk). The figure shows a rapidly rising high-frequency (AC) response curve of measured voltage across the HDI sensor as the heater power of the DFH system (and resulting ABS protrusion profile) is increased. Arrows point to bands corresponding to power changes in the heater power. There are changes between the arrows as well, but the arrows point to uniform variations in levels. The ordinate of the graph is mV and the abscissa is mW×$10^5$. The clearly modulated response curve indicates that the AC voltage can be used as an effective metric and judgment criterion for impending and occurring touchdowns.

Figure 7:
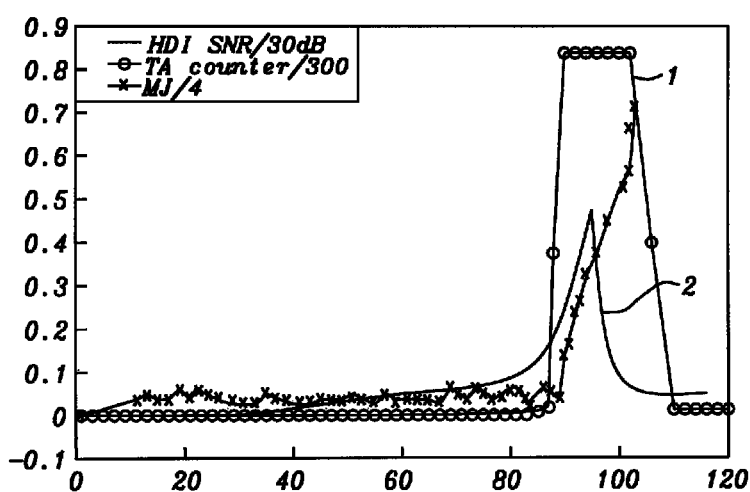
FIG. 7 is an overlay of three graphs corresponding to the performance in FIG. 6 showing digital TD detection using an HDI TA counter and other performance characteristics of the TAMR during the TD.

Referring to FIG. 7, there is shown an overlay of three curves, with two of them (1) and (2) corresponding to digital (1) and analog (2) methods of analyzing and processing the raw data of FIG. 6. Curve (1), conveys the results of FIG. 6 digitally by using an HDI TA (thermal asperity) counter, that indicates the onset of touchdown by means of digitally counting thermal spikes on the media surface. The curve shows the onset in this instance at approximately 85 mW of heater power. We may consider this method as a digital representation of the raw data of FIG. 6. Curve (2) can be considered an analog presentation of the raw data of FIG. 6 since it is obtained by direct readings of the voltage variations of FIG. 6.

To use the HDI sensor as a temperature monitor, we recommend that HDI sensor strip resistance be calibrated at different levels of heater power and that the resulting calibration then be used to infer the temperature variations of the TAMR unit during actual operation.

Figure 8:
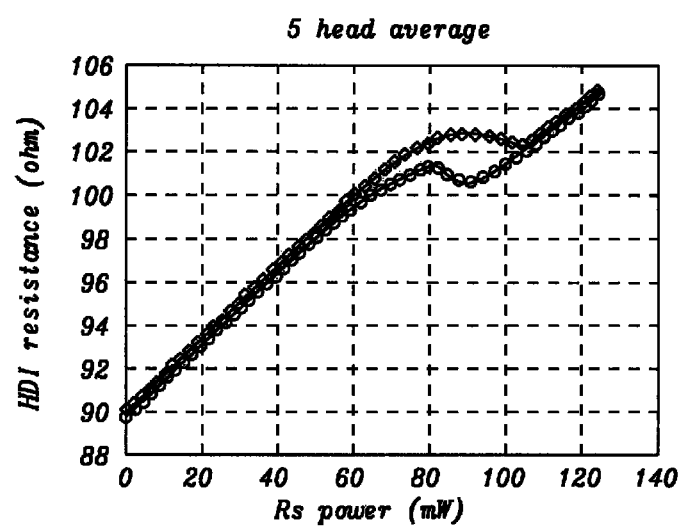
FIG. 8 is a graphical display of HDI detector DC resistance of two TAMR heads during increases in heater power to indicate the sensitivity of the HDI detector and its capability of measuring temperature variations.

Referring to FIG. 8, there is shown two curves for two exemplary TAMR heads, showing the relationship between heater power and HDI sensor strip resistance for each head during operation of the unit. At the initial increase in heater power from 0 to 80 mW, HDI DC resistance increases linearly due to a corresponding linear increase in temperature. Between 80 mW and 100 mW, the slider and head makes a contact with the rotating media, which acts as a heat sink for the hot HDI sensor. Due to the resulting temperature drop, the DC resistance falls as well, which is clearly seen in each graph, although with variations in the shape of the graph. Thus, the HDI sensor, when calibrated, can serve as a temperature monitor as well as a touchdown sensor when integrated into a TAMR head. Specifically, if an initial temperature of the system is known, the HDI resistance variations can provide an accurate indication of temperature change so that an actual temperature can also be obtained if needed.

We conclude, therefore, that by using the HDI sensor strip in conjunction with a combination of digital and/or analog measuring techniques, advanced pre-amp chips and external electronic measurement apparatus, full integration of the HDI sensor and the TAMR head structure as given herein provides a reliable method for touchdown detection, local protrusion monitoring, temperature sensing and thermal-mechanical reliability monitoring and control.

As is understood by a person skilled in the art, the preferred embodiments of the present invention are illustrative of the present invention rather than being limiting of the present invention. Revisions and modifications may be made to methods, processes, materials, structures, and dimensions through which is formed a TAMR write head with a plasmon generator optionally including a free-standing or integral peg at an ABS end and a fully integrated HDI sensor having a calibrated relationship between its temperature and resistance, while still providing such a TAMR write head, formed in accord with the present invention as defined by the appended claims.

What is claimed is:

1. TAMR (thermally assisted magnetic recording) head, comprising:
    a magnetic write pole which, when energized, produces a magnetic field for writing on a magnetic recording medium rotating beneath an ABS (air bearing surface) end;
    a dynamic flying height (DFH) heater apparatus for producing thermal protrusions of the ABS about said head, thereby controlling the effective magnetic distance between said pole and said magnetic recording medium;
    a source of electromagnetic radiation;
    a waveguide for directing said electromagnetic radiation onto a plasmon generator; wherein
    said plasmon generator is formed on said magnetic write pole and is adjacent to said waveguide and separated from said waveguide by a gap or a plasmon shield, whereby said electromagnetic radiation is coupled to a surface plasmon mode propagating towards said ABS, wherein a near field portion of said propagating surface plasmon mode is confined to a region within a recording medium beneath said plasmon generator and whereby said near field transfers energy to said region within said recording medium and whereby said recording medium is heated, thereby facilitating a recording process; and
    an HDI (head-disk interference) sensor mounted adjacent to said waveguide, wherein said sensor is formed of a material that converts temperature variations to resistance changes, whereby effects of TD (touchdown) induced vibrations of said ABS are measured and temperature variations of the head are monitored.

2. The device of claim 1 further including a peg formed at an ABS end of said plasmon generator and located between said main pole and said waveguide, wherein a near field portion of said propagating surface plasmon mode is confined to a region within a recording medium beneath and immediately surrounding said peg and whereby said near field transfers energy to said region within said recording medium and whereby said recording medium is heated, thereby facilitating a recording process.

3. The device of claim 1 further including a plasmon shield to reduce thermal spot size.

4. The device of claim 1 wherein said HDI sensor is a strip of material having a high coefficient of resistivity to temperature whereby small variations in temperature are detectable by large variations in resistance.

5. The device of claim 4 wherein said HDI sensor strip is a strip of nickel or of an iron-nickel alloy.

6. The device of claim 5 wherein said HDI sensor strip has a width of approximately 1 micron, a thickness of approximately 200 Angstroms and a height of approximately 0.1 microns.

7. The device of claim 4 wherein lateral edges of said strip are electrically contacted by electrically conductive leads to an external electronic measuring apparatus whereby a resistance of said strip or voltages across said strip are measured.

8. The device of claim 7 wherein the separation between said leads determines an active region of said HDI sensor strip.

9. The device of claim 4 wherein said HDI sensor strip is mounted between said plasmon shield and said waveguide.

10. The device of claim 9 wherein said HDI sensor strip is mounted on a leading edge side of said waveguide.

11. The device of claim 8 wherein lateral edges of said strip are electrically contacted by electrically conductive leads to an external electronic measuring apparatus whereby a resistance of said strip or voltages across said strip are measured.

12. The device of claim 11 wherein the separation between said leads determines an active region of said HDI sensor strip.

13. The device of claim 3 wherein said HDI sensor is mounted between said plasmon shield and said waveguide.

14. The device of claim 13 wherein said HDI sensor is mounted on a trailing edge side of said waveguide.

15. A method for using an integrated HDI (head-disk interference) sensor in a DFH (dynamic flying height) equipped TAMR (thermal assisted magnetic recording) head to detect touchdowns and monitor temperature variations, comprising:

providing a TAMR head having an integrated HDI sensor formed therein;

connecting said sensor to obtain resistance readings thereof;

calibrating said sensor by recording resistance of said sensor as a function of heater power to DFH heater, thereby obtaining a graphical representation corresponding to temperature rise and fall;

measuring high frequency voltage variations across said HDI sensor as a function of heater power to the DFH heater, and using the increase in the magnitude of said variations as an indicator of an impending touchdown; whereby said integrated HDI sensor now provides an indication of an impending touchdown, while simultaneously monitoring rise and fall of TAMR temperature.

16. The method of claim 15 wherein said TAMR head includes a peg formed at an ABS end of said plasmon generator and located between a main pole and a waveguide, wherein a near field portion of said propagating surface plasmon mode is confined to a region within a recording medium beneath and immediately surrounding said peg and whereby said near field transfers energy to said region within said recording medium and whereby said recording medium is heated, thereby facilitating a recording process.

17. The method of claim 15 wherein said TAMR head includes a plasmon shield to reduce thermal spot size.

18. The method of claim 15 wherein said integrated HDI sensor is a strip of material having a high coefficient of resistivity to temperature whereby small variations in temperature are detectable by large variations in resistance.

19. The method of claim 18 wherein said integrated HDI sensor is a strip of nickel or of an iron-nickel alloy.

20. The method of claim 19 wherein said integrated HDI sensor has a width of approximately 1 micron, a thickness of approximately 200 Angstroms and a height of approximately 0.1 microns.

* * * * *